US012658183B2

(12) United States Patent
Ramarao et al.

(10) Patent No.: US 12,658,183 B2
(45) Date of Patent: Jun. 16, 2026

(54) ARTIFICIAL INTELLIGENCE VOICE-BASED ASSISTANCE FOR CUSTOMIZED OR CONTEXT BASED INTERACTION

(71) Applicant: Open Text Inc., Menlo Park, CA (US)

(72) Inventors: Shreenidhi Ramarao, Bangalore (IN); Nithin A, Bengaluru (IN); Jagathishwaran Selvaraj, Tiruchengode (IN); Thomson Thomas, Bengaluru (IN)

(73) Assignee: OPEN TEXT INC., Menlo Park, CA (US)

( * ) Notice: Subject to any disclaimer, the term of this patent is extended or adjusted under 35 U.S.C. 154(b) by 93 days.

(21) Appl. No.: 18/588,960

(22) Filed: Feb. 27, 2024

(65) Prior Publication Data

US 2024/0290326 A1 Aug. 29, 2024

Related U.S. Application Data

(60) Provisional application No. 63/487,260, filed on Feb. 27, 2023.

(51) Int. Cl.
| | |
|---|---|
| *G10L 15/00* | (2013.01) |
| *G06F 9/451* | (2018.01) |
| *G10L 15/06* | (2013.01) |
| *G10L 15/16* | (2006.01) |
| *G10L 15/18* | (2013.01) |
| *G10L 15/22* | (2006.01) |

(52) U.S. Cl.
CPC .......... *G10L 15/1815* (2013.01); *G06F 9/453* (2018.02); *G10L 15/063* (2013.01); *G10L*

*15/16* (2013.01); *G10L 15/22* (2013.01); *G10L 2015/0635* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 2022/0148580 A1* | 5/2022 | Kumar | .................... | G06F 18/29 |
| 2022/0308718 A1* | 9/2022 | Klein | ....................... | G10L 15/08 |
| 2022/0308828 A1* | 9/2022 | Knapp | ............... | G10L 15/1815 |
| 2022/0335936 A1* | 10/2022 | Huang | .................... | G06F 40/35 |
| 2023/0079148 A1* | 3/2023 | Anand | .................. | G06F 16/332 |
| | | | | 707/769 |
| 2024/0071380 A1* | 2/2024 | Kudligi Anantha | .... | G10L 15/22 |
| 2025/0104702 A1* | 3/2025 | Reyes | ................. | G10L 15/1822 |

\* cited by examiner

*Primary Examiner* — Satwant K Singh
(74) *Attorney, Agent, or Firm* — Sprinkle IP Law Group

(57) ABSTRACT

An intent-based voice assistant system comprising an intent-based voice assistant, a self-contained artificial intelligence model trained to map input text to a plurality of intents and a knowledge base that maps the plurality of intents to commands supported by an application. The system includes instructions executable for: running a speech-to-text converter to convert a voice input to a text string; running the self-contained artificial intelligence model to process the text string to map the text string to an intent; mapping the intent output by the self-contained artificial intelligence model for the text string to an application action; and executing the application action using the application.

23 Claims, 7 Drawing Sheets

ARTIFICIAL INTELLIGENCE VOICE-BASED ASSISTANCE FOR CUSTOMIZED OR CONTEXT BASED INTERACTION

RELATED APPLICATIONS

This application claims the benefit of priority under 35 U.S.C. § 119(e) to U.S. Provisional Patent Application No. 63/487,260, entitled "ARTIFICIAL INTELLIGENCE VOICE-BASED ASSISTANCE FOR CUSTOMIZED OR CONTEXT BASED INTERACTION," filed Feb. 27, 2023, which is hereby fully incorporated by reference herein.

TECHNICAL FIELD

This disclosure relates to the field of voice assistant technology. Even more particularly, embodiments of this disclosure relate to artificial intelligence (AI) voice assistant technology that can be customized for contexts and use cases.

BACKGROUND

Voice assistants, also referred to as voice-based assistants, use voice-recognition technology and language processing to enable users to interact with devices to carry out various types of tasks, such as searching for information on the internet, interacting with IoT devices, and performing actions in other programs to name a few examples.

Commercially available voice assistants typically serve generic or common use cases, such as controlling consumer applications used by many people. These generic assistants are not well-suited for interacting with more specialized enterprise and industry-specific applications that have more limited deployment or use product-specific commands that are not supported by generic voice-assistants.

What is needed then is voice assistant technology that can be customized to contexts or product-specific use cases.

SUMMARY

Embodiments of the present disclosure provide systems and methods for AI voice assistant technologies for customized or context-based interactions.

More particularly, some embodiments comprise a custom AI model that represents text phrases and a first plurality of intents and is trained to output confidence scores for the first plurality of intents for a text input. Embodiments may also include a custom knowledge base that maps a second plurality of intents to actions executable by an application. For example, the knowledge base may map a second plurality of intents to actions that can be performed by existing code of an application (e.g., a mobile application).

A voice assistant is provided. In an embodiment, the voice assistant operates without communication to the Internet to service a query. The voice assistant inputs a text input converted from a voice input to the custom model and receives responsive data from the model. The responsive data from the model, according to one embodiment, includes confidence scores for intents from the first plurality of intents. In some embodiments, the responsive data from the model includes a confidence score for each of the first plurality of intents. Based on the data returned by the custom model, the voice assistant determines an intent to return to an application. In one embodiment, the voice assistant determines a highest confidence intent for the text input from the model's response data and provides the highest confidence intent to the application. In some embodiments, the voice assistant returns the highest confidence intent to the application if the highest confidence intent meets a confidence threshold. The application searches the knowledge base to determine if the intent is mapped to an action for the application. If the intent is mapped to an action for the application, the application carries out the action.

One general aspect includes a device for an intent-based voice assistant. The device includes a processor and a memory. The memory stores a self-contained artificial intelligence model trained to map input text to a plurality of intents and a knowledge base that maps the plurality of intents to commands supported by an application. The memory comprises stored instructions executable for running a speech-to-text converter to convert a voice input to a text string, running the self-contained artificial intelligence model to process the text string to map the text string to an intent, mapping the intent output by the self-contained artificial intelligence model for the text string to an application action, and executing the application action using the application. Other embodiments include corresponding methods, computer systems, and non-transitory computer readable media storing computer code translatable by a processor to perform described techniques.

Some embodiments include one or more of the following features. The self-contained artificial intelligence model processes the text string to output a corresponding intent for the text string without a call over a network. The voice input is converted to the corresponding intent without a call over a network. The string is a plurality of words determined from the voice command. The self-contained artificial intelligence model is executable to output a confidence for the corresponding intent. The stored instructions further comprise instructions translatable by the processor for comparing the confidence for the corresponding intent to the confidence threshold and passing the corresponding intent to the application based on a determination that the confidence for the corresponding intent meets the confidence threshold. The self-contained artificial intelligence model is a lightweight model executable to run on the processor with the application. The corresponding intent comprises a class label indicating a content management action. A custom intent is added by an application developer who customizes it based on the need to the mapping layer resulting in a retraining of the model.

One general aspect includes a method for an intent-based model. The method includes training a self-contained artificial intelligence model to predict intents from text input. The self-contained artificial intelligence model may be trained with text phrases and a plurality of intents. The method also includes deploying the self-contained artificial intelligence model, a voice assistant executable to use the self-contained artificial intelligence model, and a knowledge base that maps the plurality of intents to actions executable by an application to a mobile device. Other embodiments of this aspect include corresponding computer systems, apparatuses, and non-transitory, computer-readable media storing computer code translatable by a processor to perform described techniques.

Some embodiments may include one or more of the following features. The method where the self-contained artificial intelligence model is a lightweight model executable to run on the same processor with the application. The method comprises updating the self-contained artificial intelligence model with a new training phrase to create an updated artificial intelligence model. The self-contained artificial intelligence model is an updated artificial intelligence model. The method includes exporting the updated artificial intelligence model to the mobile device. The self-contained artificial intelligence model is executable to process a voice command to return a corresponding intent without a call over a network. The intent is a class label, where the self-contained artificial intelligence model and the voice assistant are deployed in a software development kit. The method includes deploying at least one of the self-contained artificial intelligence model, the voice assistant executable or the knowledge base to multiple devices. The method includes deploying the self-contained artificial intelligence model and respective knowledge bases to devices that include different applications.

In some embodiments, the voice assistant and custom model are deployed on the same device or run on the same processor as the application being controlled using the voice assistant. Furthermore, the custom model can be a self-contained model that does not require network calls to external devices to process voice prompts. As such, data contained in voice prompts remains on the device on which the voice assistant and custom model are installed, thereby enhancing security. Moreover, the voice assistant can process voice prompts to control an application, even when the device is offline. In some embodiments, the voice assistant and custom model are packaged as part of an application, such as a mobile application, deployed to a device. Implementations of the described techniques may include hardware, a method or process, or a non-transitory computer readable medium storing computer code.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
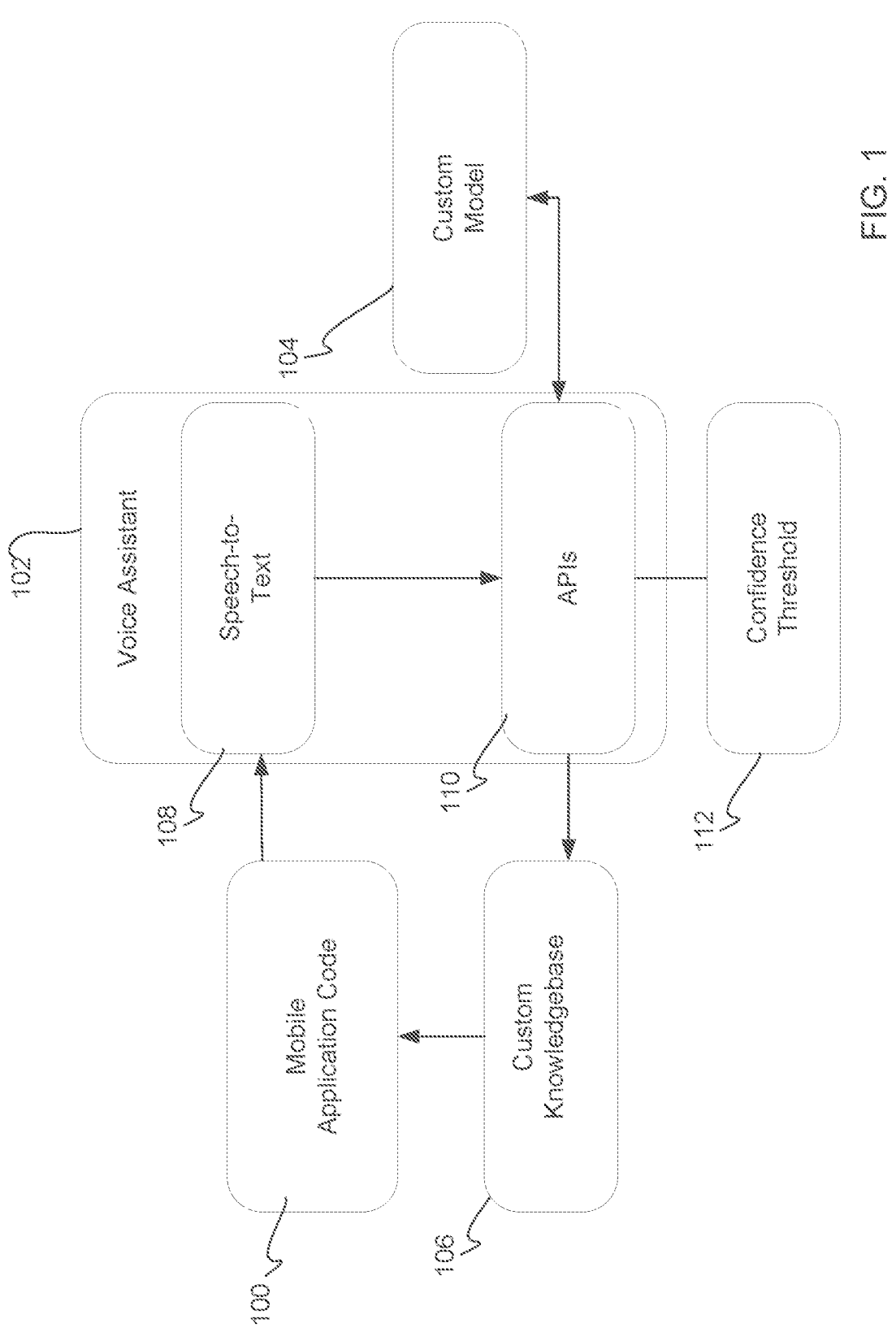
FIG. 1 is a diagrammatic representation of one embodiment of a set of components for providing customized interaction for an application.

The invention and the various features and advantageous details thereof are explained more fully with reference to the non-limiting embodiments that are illustrated in the accompanying drawings and detailed in the following description.

Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Embodiments of the present disclosure provide a voice assistant that allows users to interact with applications that cannot be adequately controlled, or controlled at all, by generic voice assistants. In one example implementation, the voice assistant is included in an enterprise mobile application to guide or help the user perform tasks in real-time on the go. According to some embodiments, the voice assistant understands natural language to determine voice commands, understands the intent of the user, and fulfills a task by using a custom knowledge base.

One aspect of providing voice-based assistance, according to some embodiments, is to build a model of the product-specific needs for an application. Building the model takes into consideration various factors such as the business use cases, the tasks that can be performed in an application, and the pain points that can be eased by voice interaction, to name some non-limiting examples. The model, according to one embodiment, is used to output an intent from input text.

Another aspect of the present disclosure includes creation of an application specific knowledge base that maps the intents represented by the model against the action to be performed in the application. Thus, the intent output by the model may be used to implement an action in an application. Furthermore, the same model may be used to provide voice assistance for different applications by providing an application specific knowledge base for each application.

In some embodiments, the model is deployed to a target device on which the voice assistant runs. For example, the model may be deployed to a mobile device. In even more particular embodiments, the model is deployed inside the application that is to be controlled by the voice assistant. Further, in some embodiments, the voice assistant is deployed in or a service usable by the application. In some embodiments, the voice assistant is deployed as a software development kit (SDK) to the mobile device or other device on which the voice assistant will be used by an end user. The SDK can be bundled with the application. In other embodiments, the SDK is deployed as a pluggable or standalone service that can be used by multiple applications on the mobile device. The custom model, according to one embodiment, is provided as a resource available through the SDK.

FIG. 1 is a diagrammatic representation of one embodiment of a set of components for providing customized interaction for an application, such as a mobile application. In the example architecture of FIG. 1, an application includes application code 100 that is executable to carry out various actions (programmatic tasks) based on calls, commands or the like supported by the mobile application. Application code 100 may, for example, include an interface, such as an application programming interface (API), through which actions of the mobile application can be implemented.

Voice assistant 102 includes code to receive and convert the voice inputs to text in a format that is accepted by a custom model 104, provide text inputs to custom model 104, get results back from custom model 104, and return class labels (intents) to application code 100, which is executable to receive the class labels, search a knowledge base 106 for actions, and execute the actions specified in knowledge base 106 for the intents. Voice assistant 102, in the illustrated embodiment, comprises a speech-to-text converter 108 to convert voice inputs from a microphone to a text input for custom model 104 and APIs or other interfaces 110 that comprise functionality to retrieve data from custom model 104 (e.g., provide text inputs to custom model 104 and receive responsive class labels or confidence scores from custom model 104) and provide class labels to application code 100.

Custom model 104 is trained to recognize intents from text. In some embodiments, custom model 104 returns a confidence score for each supported class label (intent) or a subset of the supported class labels (intents) and voice assistant 102 identifies, for a given text input, the returned class label with the highest confidence score. If the confidence score for that class label exceeds a configurable confidence threshold 112, the voice assistant 102 returns the class label to application code 100. In some embodiments, if the confidence scores for multiple labels exceed the threshold, voice assistant 102 returns the label with the highest confidence score. In yet other embodiments, voice assistant 102 does not apply a threshold. For example, voice assistant 102, in some embodiments, returns the class label with the highest confidence score without comparing the confidence score to a threshold.

Custom knowledge base 106 maps intents against actions (e.g., programmatic tasks) to be performed by application code 100. For example, according to one embodiment, custom knowledge base 106 maps intents to API calls supported by application code 100. As an even more particular example, in an implementation in which application code 100 performs content management tasks, knowledge base 106 may map intents to API calls to performing tasks such as, but not limited, deleting a document, opening a document, saving a document, checking out a document, checking in a document, or searching for content.

In some cases, knowledge base 106 specifies a context sensitive action. In some embodiments, knowledge base 106 specifies the context data to be used for the action. Application code 100 is executable to search for a received intent in knowledge base 106. If the intent is found, application code 100 executes the corresponding action, using the appropriate context data if the action is a context-based action. For example, an intent to SEARCH for content may map to different calls depending on context. Knowledge base 106 may specify, for example, that when the user is viewing a top-level page in the mobile application, the SEARCH intent maps to calls to search an entire repository, but when the user is viewing a particular folder, the SEARCH intent maps to calls to perform a search at a folder level.

It can be noted that since, in some embodiments, the voice assistant 102 or model 104 is operative to return intents, not the application-specific actions, and it is the responsibility of the application to find the right action for that intent and execute corresponding action, the same model can be reused across different applications where, for example, different knowledge bases are used to map the intents to appropriate actions for the different applications.

In some embodiments, at least one of voice assistant 102, custom model 104, custom knowledge base 106, or confidence threshold 112 are embodied on the same computing device or processed by the same hardware processor as application code 100. In a more particular embodiment, at least one of voice assistant 102, custom model 104, custom knowledge base 106, or confidence threshold 112 are implemented as part of the same mobile application that includes application code 100. In an even more particular embodiment, application 100, voice assistant 102, custom model 104, custom knowledge base 106, and confidence threshold 112 are embodied on the same computing device. In some embodiments, voice assistant 102 and custom model 104 are deployed in a software development kit (SDK) to the mobile device or other device on which the voice assistant 102 will be used by an end user. Implementing voice assistant 102 with custom model 104 as part of the same application as application code 100 or otherwise on the same processor or device as application code 100 can reduce or eliminate calls over a network to other devices as part of predicting an intent for an input, thus reducing overall turnaround time for predicting intents.

Custom model 104, in some embodiments, is a self-contained model that does not require calls over a network to external devices to predict intents for inputs. The use of a self-contained model on the same device as application code 100 and voice assistant 102 enhances data privacy as voice data or transcribed text does not have to leave the device to provide voice-based assistance. Moreover, the use of a self-contained custom model 104 on the same device as voice assistant 102 and application code 100 allows a user to use voice-based assistant 102 to control the application even when the device on which they are running is offline.

Figure 2:
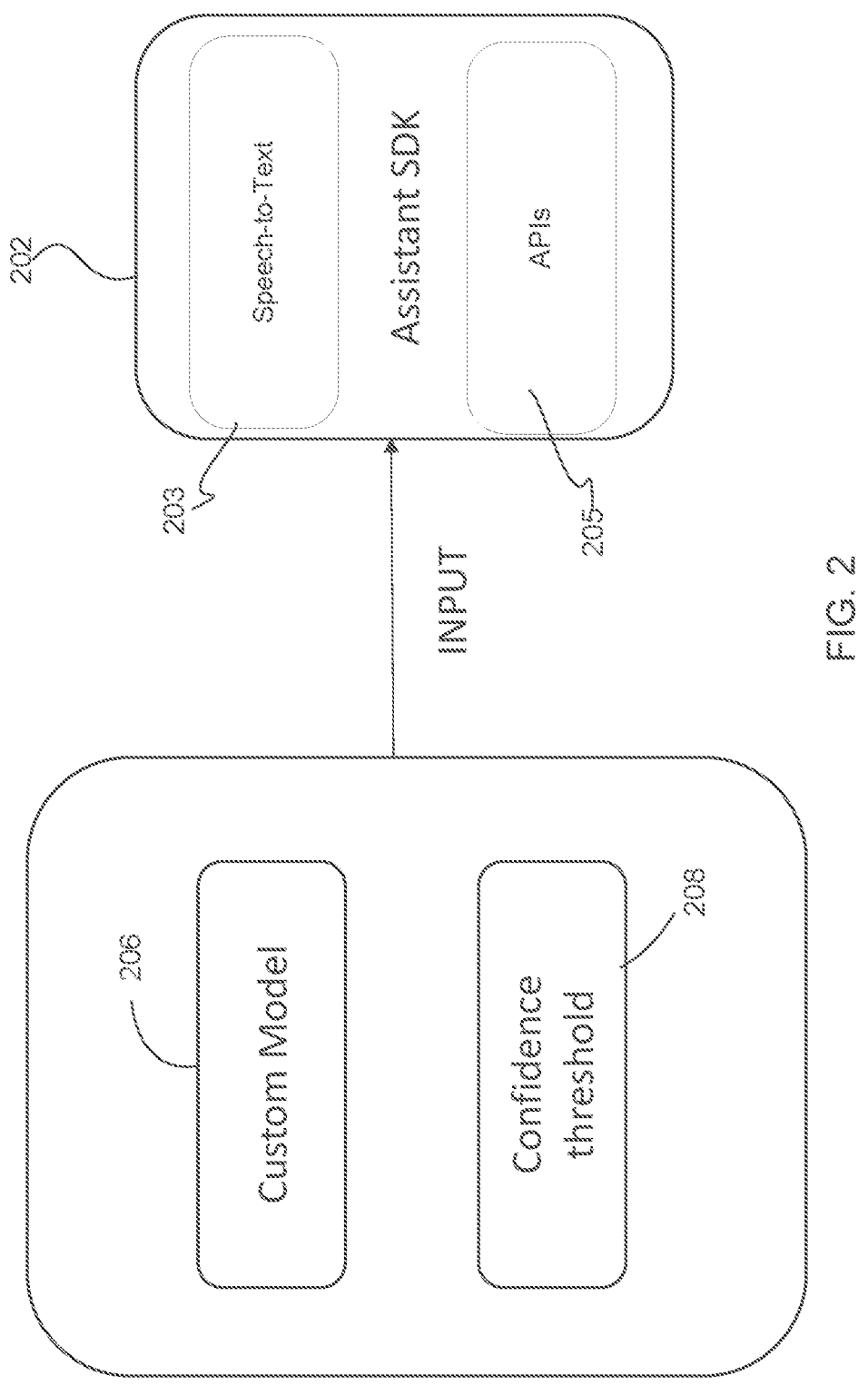
FIG. 2 is a diagrammatic representation of one embodiment of configuring a voice assistant software development kit (SDK).

Turning to FIG. 2, a diagrammatic representation of one embodiment of a voice assistant deployment. Voice assistant SDK 202 includes, for example, a speech-to-text converter 203 to convert voice inputs from a microphone to a text input for a custom model and APIs 205 or other interfaces to retrieve data from the custom model and provide class labels to application code of an application using the SDK. In one embodiment, custom model 206 is packaged with the SDK and threshold 208 is provided as configuration data for the application. During operation, communication with model 206 occurs via APIs 205. As such, the functionality to provide customized voice-based assistance for a mobile application (e.g., custom model 206, confidence threshold 208, and other functionality) is wrapped in pluggable voice assistant SDK 202.

Figure 3:
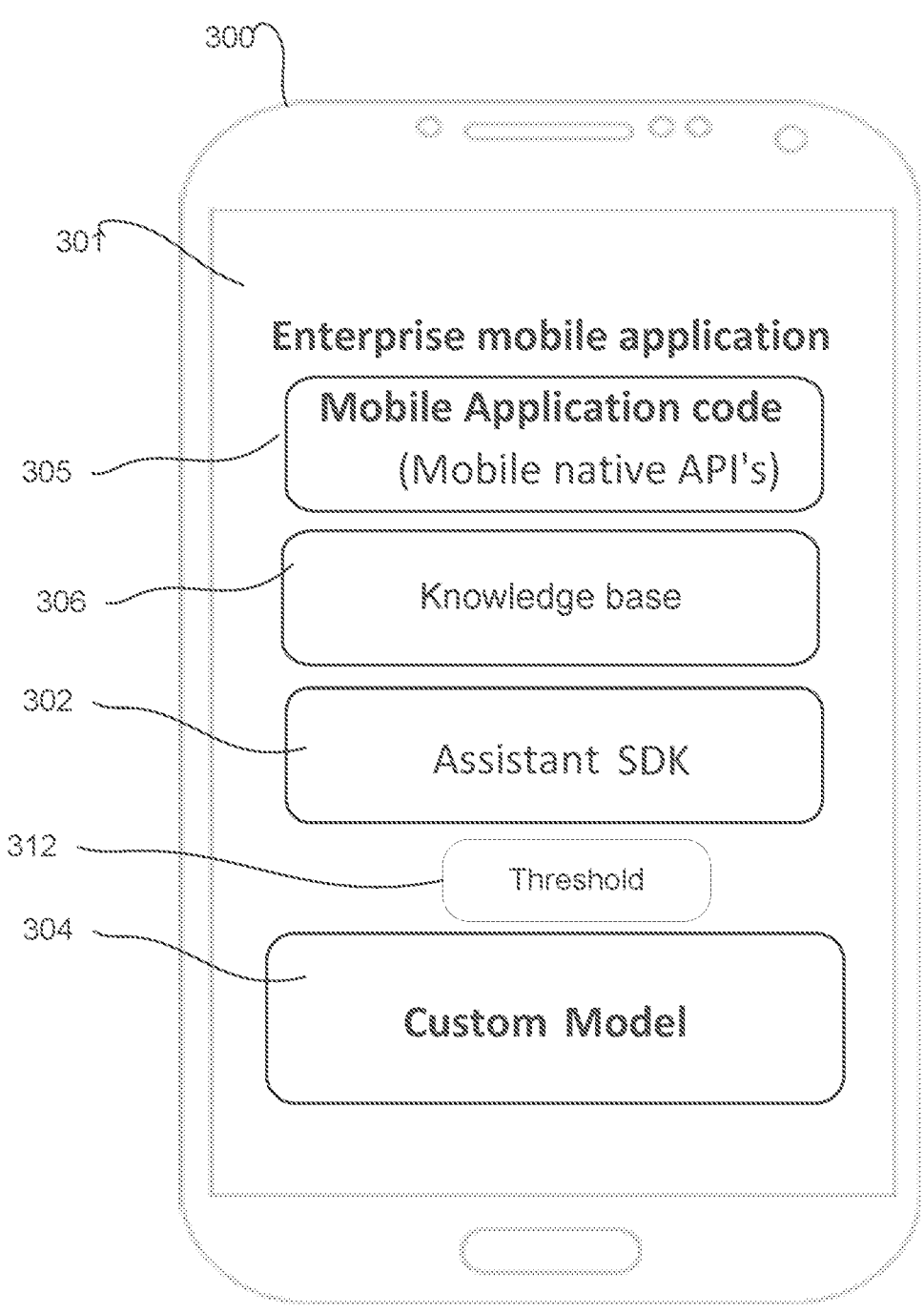
FIG. 3 is a diagrammatic representation of one embodiment of a mobile application that includes a custom model and assistant SDK.

FIG. 3 is a diagrammatic representation of one embodiment of a mobile device with a voice-based assistant deployed. In an embodiment, a voice assistant SDK 302 is added as a dependency in a mobile application 301 and a custom model 304 is packaged as a resource with the SDK mobile application 300. Mobile application 301 also includes native mobile application code 305. Confidence threshold 312 is provided as configuration data for enterprise mobile application 301. Mobile application 301 further includes or accesses searchable knowledge base 306 that maps intents to actions executable by mobile application 301.

Figure 4:
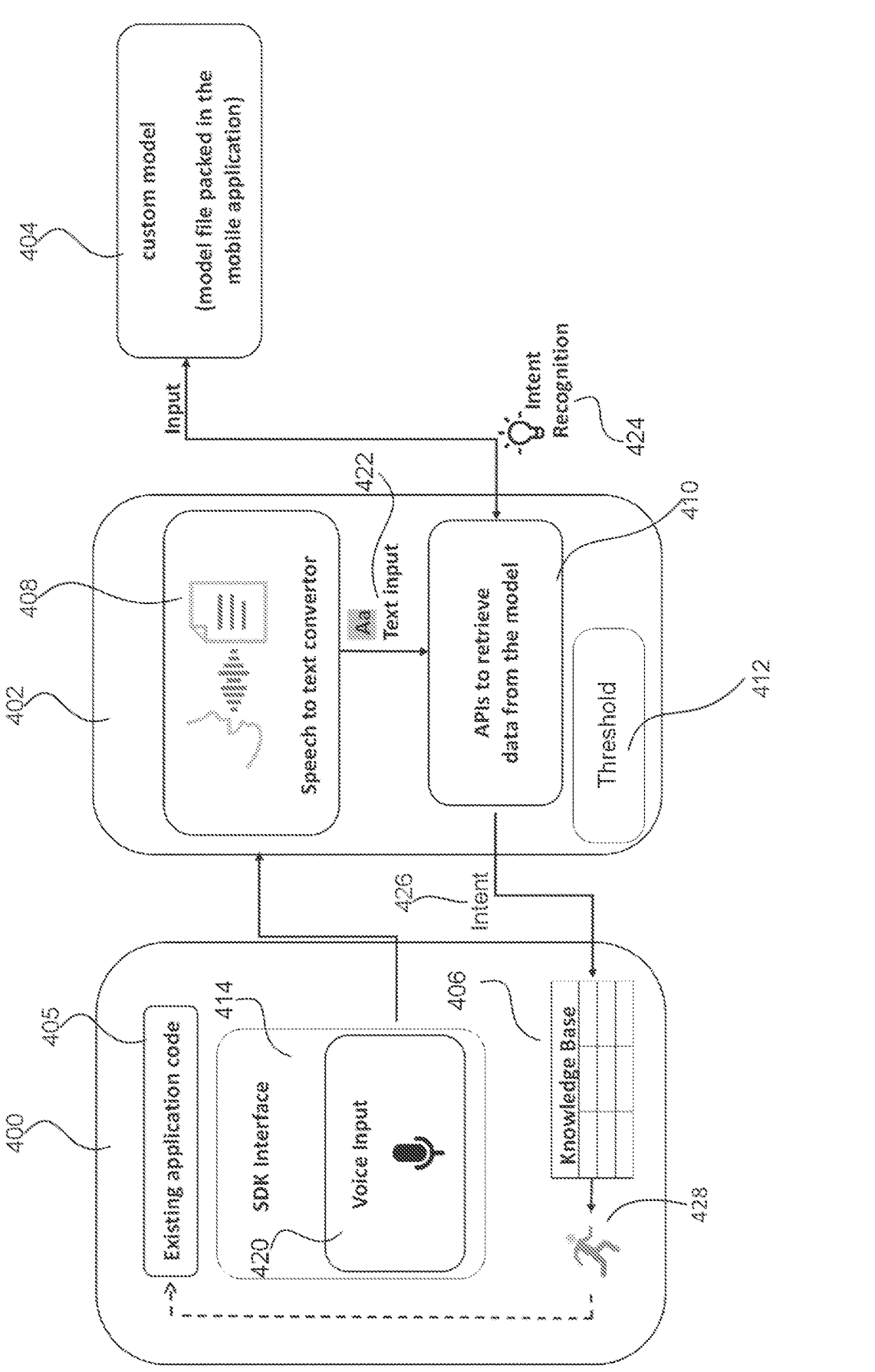
FIG. 4 is a diagrammatic representation of one embodiment of a flow for providing voice-based assistance in a mobile application.

FIG. 4 is a diagrammatic representation of one embodiment of a flow for providing voice-based assistance in a mobile application 400. According to one embodiment, a voice assistant SDK 402 is added as a dependency in mobile application 400 and a custom model 404 is packaged as a resource in mobile application 400. Confidence threshold 412 is provided as configuration data for mobile application 400. One non-limiting embodiment of a custom model 404 is illustrated in more detail in FIG. 5. Mobile application 400 also includes native mobile application code 405 and custom knowledge base 406. In this example, the user has granted microphone access to mobile application 400.

Assistant SDK 402 includes a speech-to-text converter 408 to convert voice inputs from a microphone to a text input for custom model 404 and APIs or other interfaces 410 to retrieve data from custom model 404 (e.g., provide text inputs to custom model 404 and receive responsive class labels or confidence scores from custom model 404) and provide class labels to application code 405. SDK 402 is also configured with a confidence threshold 412.

In operation, assistant SDK 402 provides an SDK interface 414 that can be utilized by mobile application 400 to provide voice input 420 from the microphone to assistant SDK 402. Speech-to-text converter 408 converts the voice input 420 from the microphone to a text input 422 for custom model 404 and uses the appropriate API 410 to request an inference from custom model 404.

Custom model 404 returns class labels (intents) with confidence scores for the text input 422. In some embodiments, custom model 404 is a self-contained model that does not require calls over a network to infer intents for inputs. Thus, for example, converting text string 422 to an intent 426 does not require a call over a network to a server or other remote computer. Further, if the voice assistant and self-contained custom model run on the same device, the voice input 420 can be converted to intent 426 without a call over the network to another computing device. Assistant SDK 402 performs intent recognition 424 to determine the class label with the highest confidence score and whether the confidence score of the class label with the highest confidence score exceeds confidence threshold 412. If the confidence score for the class label with the highest confidence score exceeds the threshold confidence score, assistant SDK 402 returns that class label (intent) 426. Mobile application 400 searches custom knowledge base 406 for an action 428 corresponding to the intent and executes the action of application code 405.

In some embodiments, if no intent returned by custom model 404 for text input 422 has a confidence score that meets the threshold confidence score or the intent returned by assistant SDK 402 is not found in knowledge base 406, mobile application 400 does not execute an intent-based action responsive to the voice command. Mobile application 400, in some embodiments, returns an indication to the user that the voice command could not be understood or provides another notification to the user.

Figure 5:
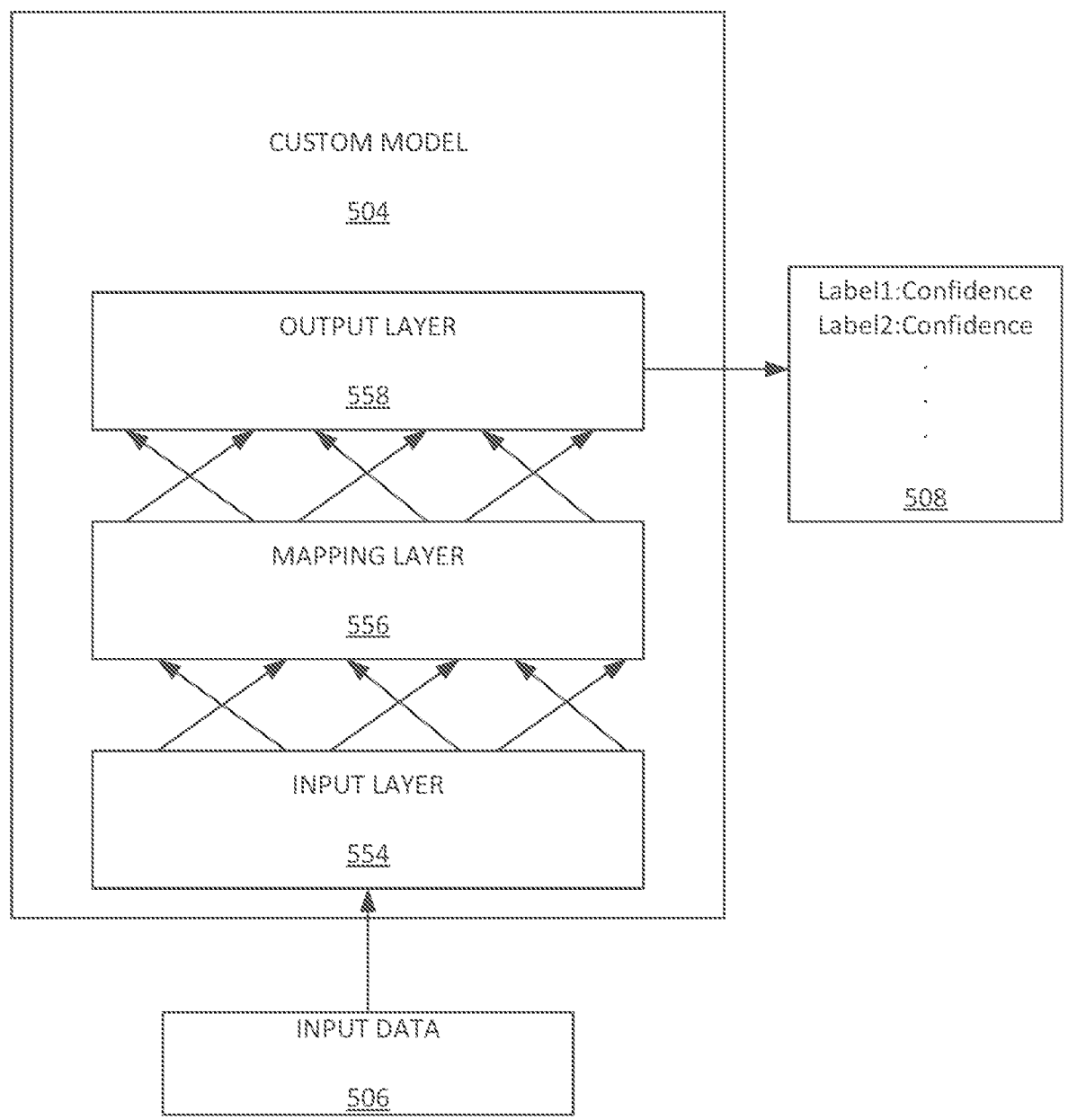
FIG. 5 is a diagrammatic representation of one embodiment of a voice-based assistance machine learning model.

Turning to FIG. 5, a diagrammatic representation of one embodiment of a custom model 504 is illustrated. In an embodiment, custom model 504 is a lightweight neural network trained with language labels. An advantage of the lightweight neural network is the ability to achieve accuracy similar to a conventional neural network or large language model, but with less computational cost. A lightweight neural network is suitable for operation on a mobile device or any other type of device with budgeted computational capability. The lightweight neural network, in an embodiment, runs on the same processor as the application that the voice assistant utilizing custom model 504 runs. The assistant SDK can provide tools for optimization of the custom model 504 to the specific type of processor, to tailor the custom model 504 performance to user expectations.

In an embodiment, custom model 504 comprises a plurality of layers, including an input layer 554, a mapping layer 556, and an output layer 558. Input layer 554 is responsible for bringing the input text data 506, such as input text 422, into the neural network and providing the text input 506, as processed text data, to a hidden layer of the neural network. Input layer 554 comprises a plurality of nodes, where each node provides a calculated value based on the received input data 506. In an embodiment, mapping layer 556 comprises one or more hidden layers of the neural network. Mapping layer 556 is operative to map the processed text data that represents the text input to one or more class labels (intents). Output layer 558 generates an output 508 of class labels and confidences for input data 506. One example of intents that correspond to categories of actions is illustrated in Appendix A.

In an embodiment, an API provided by an assistant SDK (e.g., SDK 202, SDK 302, SDK 402) is employed in conjunction with the custom model 504 and the application running on the mobile device. Since the application (e.g., enterprise mobile application 301, enterprise mobile application 400) to be controlled by the voice assistant may require the intent output by the output layer 558 be provided in a compatible format, an API provided by the assistant SDK is used, in some embodiments, to receive the output 508 and process the output 508 to return an intent in a format used by the application.

Figure 6:
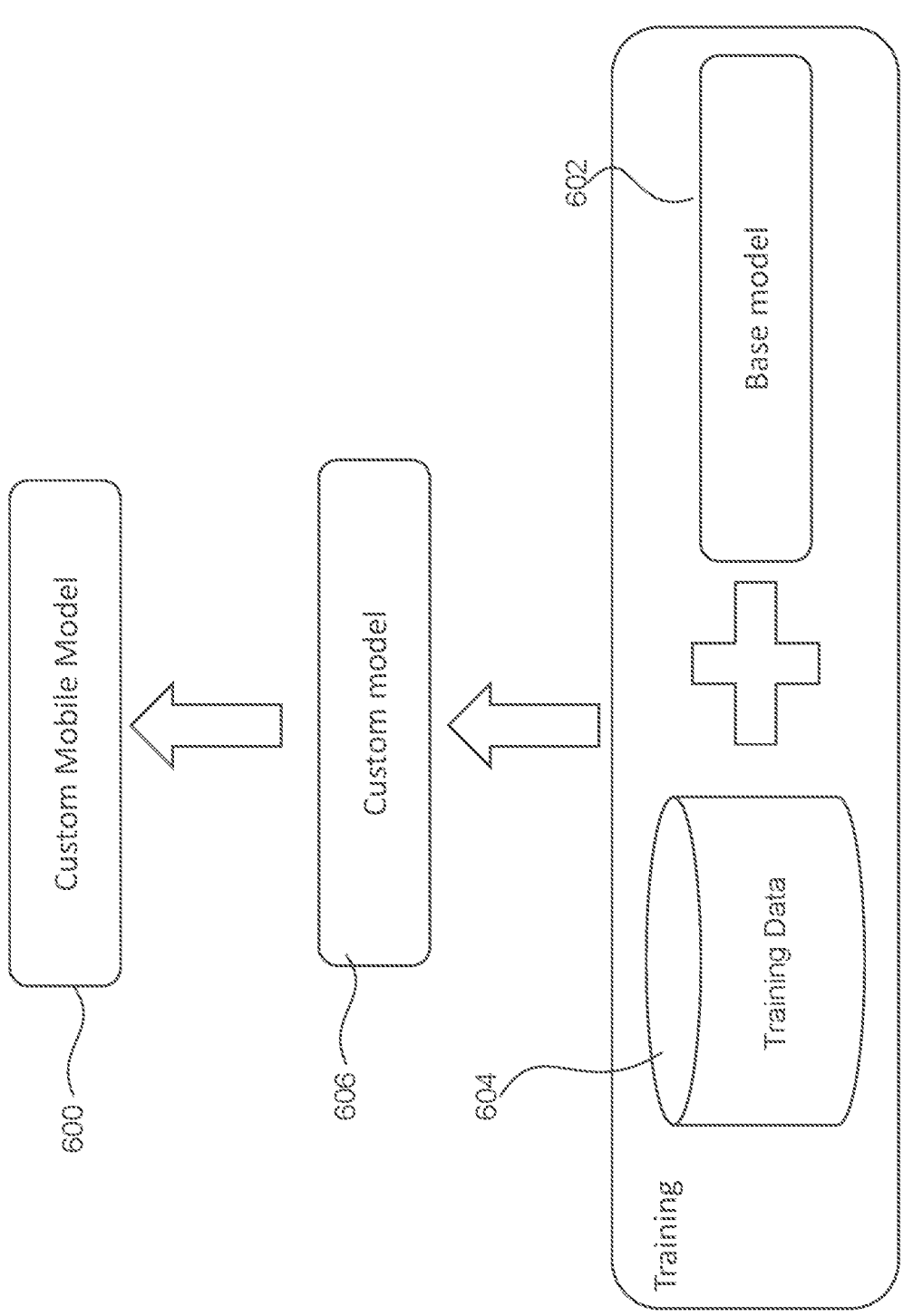
FIG. 6 is a diagrammatic representation of one embodiment of training a model.

Turning to FIG. 6, one embodiment of training a deployable custom model 600 is illustrated. Custom model 600 is an AI model trained to recognize intents from text input. According to one embodiment, training starts with a base model 602, which is an existing machine learning model. Base model 602 may, for example, be a generic model that has not been trained for the specific application or use case. In some embodiments, base model 602 is a generic model trained on a generic set of vocabulary. In some embodiments, a Bidirectional Encoder Representations from Transformers (BERT) mode trained on a set of vocabulary is used as a base model.

Base model 602 is then trained to recognize intents for applications, such as, but not limited to applications developed from a base application. Training data 604 can be prepared according to the requirements of an application (e.g., a mobile application) in a stratified manner. Training data 604 is run with base model 602 to create a custom model 606 that represents text phrases and corresponding intents. Here, custom model 606, and hence custom model 600, is trained using a supervised technique. More particularly, base model 602 is used, which is then combined with the labeled training data 604 to train a custom model 606.

Custom model 606 is converted into a mobile machine learning model suitable for deployment to a mobile device for client-side inference. In some embodiments, custom model 600 is packed inside of a mobile application. According to one embodiment, custom model 606 is a TensorFlow model and custom model 600 is TensorFlow lite model. TensorFlow is a trademark of Google, Inc. of Mountain View, California (all trademarks, service marks, collective marks, or certification marks or trade names used herein are the property of their respective owners). Thus, in some embodiments, custom model 600 can be embodied as a .tflite file that can be included as a resource in a mobile application.

Thus, a custom AI model is trained that represents a plurality of text phrases and corresponding intents. When an input text is provided to the custom AI model, the custom AI model returns result data. In some embodiments, the custom AI model returns the highest confidence label for the input text. In other embodiments, the custom AI model returns for the input text confidence scores for a plurality of class labels (intents) (in some embodiments confidence scores for all the class labels).

Some content management systems and other platforms provide an intuitive development environment that allows users to develop applications on the platform. The development environment may define the actions with which applications can be configured. For applications developed in such an environment, a base model 602 can be trained with intents corresponding to the actions with which applications developed in the environment can be configured. Application-specific knowledge bases can be deployed to map intents to the specific actions supported by deployed applications.

Appendix A illustrates an example embodiment of training data that includes text phrases labeled with intents for training a model for Documentum D2 mobile applications (Documentum is a trademark of Open Text Corporation, Canada) (all trademarks, service marks collective marks, or certification marks or trade names used herein are the property of their respective owners). A knowledge base (e.g., knowledge base 106, knowledge base 306, knowledge base 406) maps the intents to specific actions supported by an application. Some examples using intents from Appendix A can include:

NAVIGATION_FAVORITES: Maps to application commands to take the user to the list of favorite files.

NAVIGATION_RECENT: Maps to application commands to take the user to a recently accessed documents page.

NAVIGATION_CHECKOUT: Maps to application commands to display checked-out documents.

NAVIGATION_OFFLINE: Maps to application commands to display a list of files the user can access when there is no internet connection.

NAVIGATION_TASK: Maps to application commands to display a page with a pending set of tasks the user has left to complete.

NAVIGATION_HOME: Maps to application commands to navigate to the user landing page.

SEARCH: Maps to application commands to search a document with a keyword based on context.

LOGOUT: Maps to application commands to sign out the user from the enterprise app.

Using such a model, if a user says "show me the recently accessed documents", the application passes the voice input to the voice assistant (e.g., voice assistant 102, assistant SDK 202, assistant SDK 302, assistant SDK 402), the voice assistant uses the custom model to determine the highest confidence score intent and, if the confidence score of the intent is above the confidence threshold (e.g., confidence threshold 112, confidence threshold 208, confidence threshold 312, confidence threshold 412) passes NAVIGATION-_RECENT back to the application (e.g., application code 100, mobile application 301, mobile application 400), which searches for the corresponding intent in the knowledge base (e.g., knowledge base 106, knowledge base 306, knowledge base 406). If the intent NAVIGATION_RECENT is found in the knowledge base, the application executes the corresponding action—for example, the application executes the API call or other application command specified in the knowledge base. In this example, the user is taken directly to the recently accessed documents page.

As another example, if the user says "find documents related to Corrective Action Request", the application passes the voice input to the voice assistant (e.g., voice assistant 102, assistant SDK 202, assistant SDK 302, assistant SDK 402), the voice assistant uses the custom model to determine the highest confidence score intent—in this example, the highest confidence score intent would be SEARCH, and, if the confidence score of the intent is above the confidence threshold (e.g., confidence threshold 112, confidence threshold 208, confidence threshold 312, confidence threshold

412) passes SEARCH back to the application (e.g., application code 100, mobile application 301, mobile application 400), which searches for the corresponding intent in the custom knowledge base (e.g., knowledge base 106, knowledge base 406).

The action corresponding to the SEARCH intent may be based on context such as the user's current location in the application. According to one embodiment, then, the same intent may map to different actions depending on context. For example, the knowledge base may specify that the SEARCH intent maps to calls to search an entire repository if the user is at a home page level in the mobile application and that the SEARCH intent maps to calls to perform a search at a folder level if the user is at a folder level in the mobile application. The application thus executes the action associated in the knowledge bases with the SEARCH intent and current context.

In some embodiments, an application developer trains base custom model 604/custom mobile model 600 for a specific use case or application. If the developer (or another application developer) wants to use custom mobile model 600 for another application, they can directly use it if it suits their requirements and provide a knowledge base for the application, or they can retrain it with their specific training data and replace custom mobile model 600 with an updated version.

Figure 7:
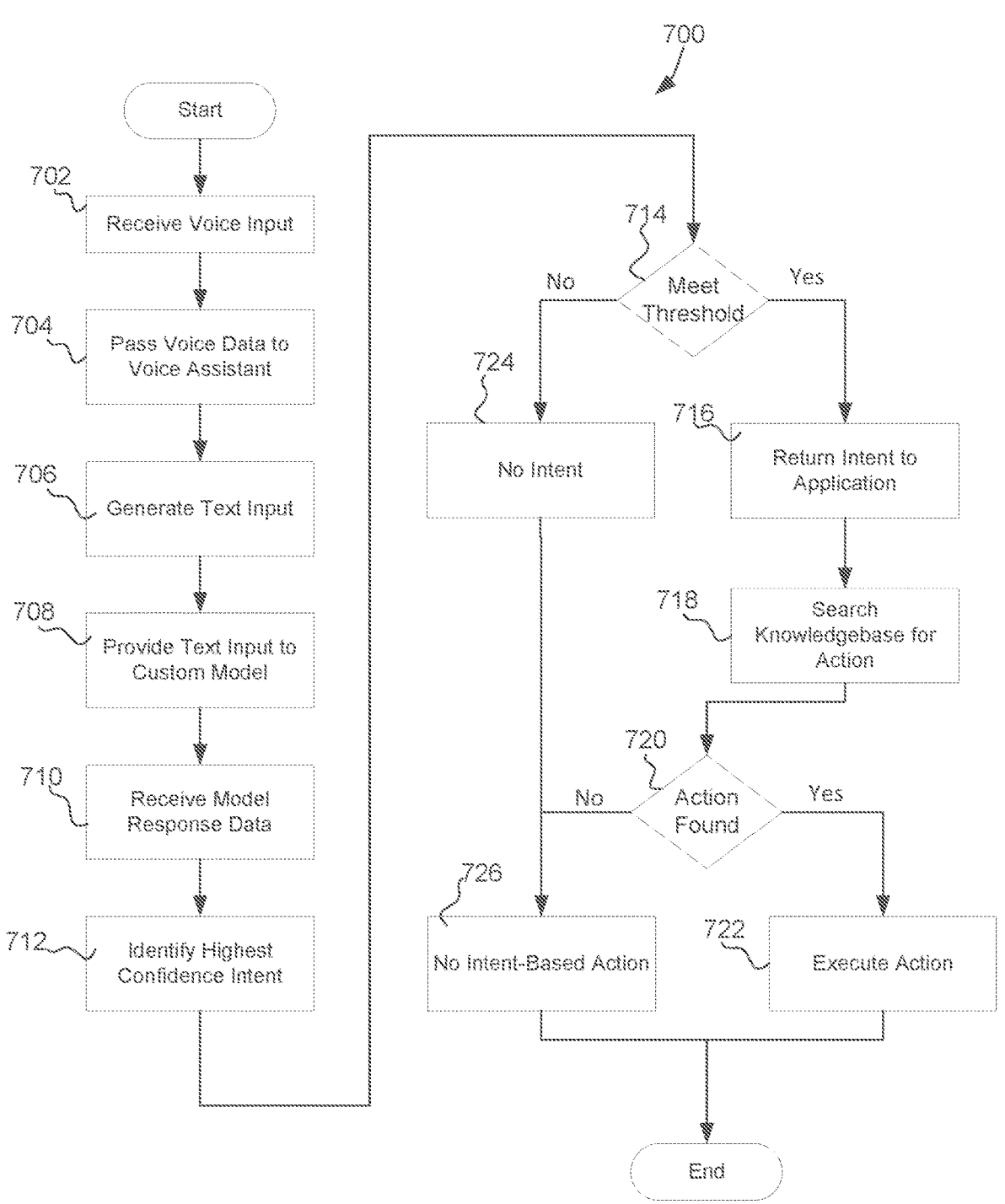
FIG. 7 is a flowchart illustrating one embodiment of a method for voice-based assistance.

FIG. 7 is a flow chart illustrating one embodiment of a method 700 for providing customized voice-based assistance for a mobile application. In some embodiments, method 700 of FIG. 7 is embodied as computer-executable instructions on a non-transitory computer readable medium. In even more particular embodiments, embodiments of FIG. 7 are implemented by an application (e.g., a mobile application) that includes a custom machine learning model, such as an AI model, packaged in the application (e.g., mobile application). Further, in some embodiments, one or more steps of FIG. 7 are implemented in an SDK added as a dependency in an application, such as a mobile application.

At step 702, an application receives a voice input and, at step 704, passes it to a voice assistant. According to one embodiment, the voice assistant is implemented as an SDK that is, for example, plugged into the application (e.g., added as a dependency). The voice assistant, at step 706, converts the voice data to text that is in a format that can be input into a custom model. The voice assistant, at step 708, inputs the text into a custom model and, at step 710, receives response data from the custom model. The voice assistant, at step 712, identifies a highest confidence intent returned by the custom model. That is, the voice assistant identifies the intent for which the custom model had the highest confidence for the input text. At step 714, the voice assistant determines if the confidence score of the highest confidence intent meets a threshold confidence score (step 714). If so, the voice assistant, at step 716, returns that intent to the application as the intent for the voice input received at step 702. The application, at step 718, searches a custom knowledge base for an action specified for the intent. If an action is found in the knowledge base, as determined at step 720, the application executes the action at step 722.

If, at step 714, the voice assistant determines that no intent meets the confidence threshold for the input text, the voice assistant returns and indication to the application that no intent was found in the voice data—that is, that the voice input could not be understood, at least in context of interacting with the application (step 724). In any case, if the no intent meets the threshold or no action is found for an intent (step 720), the application does not execute an intent-based action for the voice input. In some embodiments, the application notifies the user that it did not understand the voice command or provides another notification to the user of an error (step 726).

FIG. 7 is merely an illustrative example, and the disclosed subject matter is not limited to the ordering or number of steps illustrated. Embodiments may implement additional steps or alternative steps, omit steps, or repeat steps.

In previously described embodiments, a knowledge base maps intents output by the custom model to application actions, such as API calls. In other embodiments, the custom model is trained to output application actions. For example, the knowledge base may be implemented in a layer of the custom model. In one such embodiment, an output layer of the custom model is customized to output specific applications commands supported by the application running on the mobile device. Since the application may require the specific command output by the output layer to be provided in a compatible format, an API (e.g., an API provided by the assistant SDK) is used, in some embodiments, to receive the specific commands and process the specific commands to output the highest confidence command in a format that can be ingested by the enterprise mobile application.

For example, in response to a voice utterance such as "sign off," the mapping layer receives a text input that corresponds to "sign off." The mapping layer then maps the text input to one or more class labels (intents) and confidences. The output layer maps the intents to specific commands to output the commands and confidences. For example, the mapping layer may map the utterance "sign off" to the intent "LOGOUT" as the highest confidence intent and the output layer map LOGOUT to the command "sign_out". Thus, the API may process the specific commands and confidences output by the model to output the "sign_out" command in a format compatible with the mobile application. By having the specific command in the compatible format, the enterprise mobile application can execute the command to complete the task requested by the user.

Embodiments of the present disclosure may be implemented on a variety of devices including mobile devices, such as smartphones. According to one embodiment, the mobile device, or other computing device includes a computer processor and associated memory. The computer processor comprises an integrated circuit for processing instructions. For example, the computer processor may comprise one or more cores or micro-cores of a processor.

Memory includes volatile memory, non-volatile memory, semi-volatile memory, or a combination thereof. The memory may, for example, include RAM, ROM, flash memory, a hard disk drive, a solid-state drive, an optical storage medium (e.g., CD-ROM), or other computer readable memory or combination thereof. The memory stores instructions executable by the processor. The computing device also includes input/output ("I/O") devices, such as a keyboard or touchscreen input, a display, a microphone, or the like. The computing device may also include a communication interface, such as a network interface card, to interface with a network.

Although the invention has been described with respect to specific embodiments thereof, these embodiments are merely illustrative, and not restrictive of the invention. The description herein of illustrated embodiments of the invention, including the description in the Abstract, Summary, and Appendix is not intended to be exhaustive or to limit the invention to the precise forms disclosed herein. Rather, the description is intended to describe illustrative embodiments, features, and functions in order to provide a person of ordinary skill in the art context to understand the invention without limiting the invention to any particularly described embodiment, feature, or function, including any such embodiment feature or function described in the Abstract, Summary, or Appendix. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, read-only memory ("ROM"), random access memory ("RAM"), hard drive ("HD"), input/output ("I/O") device(s), and communication interfaces. The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. The processes described herein may be implemented in suitable computer-executable instructions that reside on a computer readable medium.

Any suitable programming language can be used to implement the routines, methods, or programs of embodiments of the invention described herein, including C, C++, Java, JavaScript, HTML, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines, or portions thereof described herein, where such software programming or code can be stored in a computer-readable medium and can be operated on by a processor to permit a computer to perform any of the steps, operations, methods, routines, or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such a computer-readable medium shall generally be machine readable and include software programming or code that can be human readable (e.g., source code) or machine readable (e.g., object code). Examples of non-transitory computer-readable media include random access memories, read-only memories, HDs, data cartridges, magnetic tapes, floppy diskettes, flash memory drives, optical data storage devices, CD-ROMs, and other appropriate computer memories and data storage devices. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals, or other information. A processor can include a system with a general-purpose CPU, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

APPENDIX A

| Text Phrase | Intent |
| --- | --- |
| Display offline documents | NAVIGATION_OFFLINE |
| show favorite tile | NAVIGATION_FAVORITES |
| display my tasks | NAVIGATION_TASK |
| route to my tasks | NAVIGATION_TASK |
| can you pull up my tasks | NAVIGATION_TASK |
| Go to favorite | NAVIGATION_FAVORITES |
| Show my offline documents | NAVIGATION_OFFLINE |
| see my widget landing screen | NAVIGATION_HOME |
| view all of my task | NAVIGATION_TASK |
| signing off | LOGOUT |
| signing off now | LOGOUT |
| Show my recent access documents | NAVIGATION_RECENT |
| Display favorite documents | NAVIGATION_FAVORITES |
| logging off the app | LOGOUT |
| go to list of all pending tasks | NAVIGATION_TASK |
| checked out | NAVIGATION_CHECKOUT |
| hey d2 mobile sign in as a new user | LOGOUT |
| Display main page | NAVIGATION_HOME |
| take me to check out documents | NAVIGATION_CHECKOUT |
| Go to my offline documents | NAVIGATION_OFFLINE |
| take to my recently accessed files screen | NAVIGATION_RECENT |
| tribute to the troops find the documents having this | SEARCH |
| pull up main screen | NAVIGATION_HOME |
| Go to my tasks page | NAVIGATION_TASK |
| Display my recently accessed page | NAVIGATION_RECENT |
| navigate to all list of my task | NAVIGATION_TASK |
| Display offline files | NAVIGATION_OFFLINE |
| Go to tasks | NAVIGATION_TASK |
| go to landing page | NAVIGATION_HOME |
| home page show | NAVIGATION_HOME |
| take to my favorite files | NAVIGATION_FAVORITES |
| find temperature controlled documents | SEARCH |
| go to list of task | NAVIGATION_TASK |
| search for journal of the american statistical association | SEARCH |
| pull up recent access files | NAVIGATION_RECENT |
| display my recent files | NAVIGATION_RECENT |
| open favorites documents | NAVIGATION_FAVORITES |
| take to my offline | NAVIGATION_OFFLINE |
| i want to see favorites | NAVIGATION_FAVORITES |
| get me to checked out documents | NAVIGATION_CHECKOUT |
| take me to recently accessed documents screen | NAVIGATION_RECENT |
| Show my checked out documents | NAVIGATION_CHECKOUT |
| log off | LOGOUT |
| Display home | NAVIGATION_HOME |
| get me to landing screen | NAVIGATION_HOME |
| open offline documents | NAVIGATION_OFFLINE |
| lock out of the app | LOGOUT |
| list of my task | NAVIGATION_TASK |
| Show my recently accessed files page | NAVIGATION_RECENT |
| take to my offline files page | NAVIGATION_OFFLINE |
| take me to home screen | NAVIGATION_HOME |
| open home | NAVIGATION_HOME |
| i would like to see my tasks | NAVIGATION_TASK |
| please navigate to initial main page | NAVIGATION_HOME |

APPENDIX A-continued

| Text Phrase | Intent |
| --- | --- |
| sign out now | LOGOUT |
| help me find the work unite and win | SEARCH |
| Go to offline files | NAVIGATION_OFFLINE |
| Display my offline documents | NAVIGATION_OFFLINE |
| Go to my task | NAVIGATION_TASK |
| Display checked out files | NAVIGATION_CHECKOUT |
| logout of the app | LOGOUT |
| navigate to landing page | NAVIGATION_HOME |
| show task tile | NAVIGATION_TASK |
| Display my landing page | NAVIGATION_HOME |
| display checked out documents | NAVIGATION_CHECKOUT |
| can you pull up recent access documents | NAVIGATION_RECENT |
| i want to see recently accessed | NAVIGATION_RECENT |
| search for the keyword recently accessed | SEARCH |
| perform sign out action | LOGOUT |
| please go home | NAVIGATION_HOME |
| Go to favorite documents | NAVIGATION_FAVORITES |
| Show my checked out files | NAVIGATION_CHECKOUT |
| Display recent access documents | NAVIGATION_RECENT |
| Display landing page | NAVIGATION_HOME |
| Display recently accessed documents | NAVIGATION_RECENT |
| show me recent access files | NAVIGATION_RECENT |
| Show my recent accessed files | NAVIGATION_RECENT |
| find all the files having the keyword favorite | SEARCH |
| navigate to tasks | NAVIGATION_TASK |
| logout my account | LOGOUT |
| recently accessed | NAVIGATION_RECENT |
| pull up offline files | NAVIGATION_OFFLINE |
| please navigate to the first home page | NAVIGATION_HOME |
| close the ongoing session | LOGOUT |
| Go to favorites page | NAVIGATION_FAVORITES |
| Go to recent access files | NAVIGATION_RECENT |
| find a document with d2 product | SEARCH |
| show me favorite documents | NAVIGATION_FAVORITES |
| Please show favorites | NAVIGATION_FAVORITES |
| looking for oil reserve | SEARCH |
| show me off to landing page | NAVIGATION_HOME |
| take me to favorites page | NAVIGATION_FAVORITES |
| search for files containing term recent | SEARCH |
| Go to check out documents page | NAVIGATION_CHECKOUT |
| show me tasks | NAVIGATION_TASK |
| signing off the app | LOGOUT |
| open checked out | NAVIGATION_CHECKOUT |
| Show my checked out documents | NAVIGATION_CHECKOUT |
| end current session | LOGOUT |
| show me the sign in screen | LOGOUT |
| direct me directly to home page | NAVIGATION_HOME |
| please open home page | NAVIGATION_HOME |
| close the app | LOGOUT |
| view task | NAVIGATION_TASK |
| show creativity of painting of me too | SEARCH |
| favorite | NAVIGATION_FAVORITES |
| Display recent access | NAVIGATION_RECENT |
| terminate my session | LOGOUT |
| get me to main screen | NAVIGATION_HOME |
| get the list of all my tasks | NAVIGATION_TASK |
| take to my landing page | NAVIGATION_HOME |
| end my session | LOGOUT |
| get me to recently accessed documents | NAVIGATION_RECENT |
| exit the app | LOGOUT |
| take to my recently accessed | NAVIGATION_RECENT |
| search covid vaccine documents | SEARCH |
| get me to recently accessed tile | NAVIGATION_RECENT |
| Show my recently accessed documents | NAVIGATION_RECENT |
| open checked out files | NAVIGATION_CHECKOUT |
| checked out files show | NAVIGATION_CHECKOUT |
| Show home | NAVIGATION_HOME |
| Please pull up check out documents | NAVIGATION_CHECKOUT |
| Display favorites files | NAVIGATION_FAVORITES |
| i would like to see my favorite documents | NAVIGATION_FAVORITES |
| Please show my tasks | NAVIGATION_TASK |
| Show recent access documents | NAVIGATION_RECENT |
| end session | LOGOUT |
| favorites | NAVIGATION_FAVORITES |

APPENDIX A-continued

| Text Phrase | Intent |
|---|---|
| display my tasks tile | NAVIGATION_TASK |
| open recently accessed files | NAVIGATION_RECENT |
| take me to recent access page | NAVIGATION_RECENT |
| put on view my task | NAVIGATION_TASK |
| Show offline files | NAVIGATION_OFFLINE |
| Show offline documents | NAVIGATION_OFFLINE |
| please open favorites documents | NAVIGATION_FAVORITES |
| Show checked out documents | NAVIGATION_CHECKOUT |
| Go to favorite files | NAVIGATION_FAVORITES |
| Go to my home | NAVIGATION_HOME |
| display recent access files | NAVIGATION_RECENT |
| find the documents with the word offline | SEARCH |
| Show offline files | NAVIGATION_OFFLINE |
| Go to recent access documents | NAVIGATION_RECENT |
| can i get the listings for hr documents | SEARCH |
| show check out tile page | NAVIGATION_CHECKOUT |
| search for the phrase recent | SEARCH |
| search for the adventures of cookie and cream | SEARCH |
| close my session | LOGOUT |
| open tasks | NAVIGATION_TASK |
| Go to recently accessed | NAVIGATION_RECENT |
| get me to checked out files | NAVIGATION_CHECKOUT |
| open recent access files | NAVIGATION_RECENT |
| Show my offline documents | NAVIGATION_OFFLINE |
| Go to home page | NAVIGATION_HOME |
| open favorites files screen | NAVIGATION_FAVORITES |
| i would like to see my home page | NAVIGATION_HOME |
| open recently accessed documents | NAVIGATION_RECENT |
| my tasks | NAVIGATION_TASK |
| display my favorite files | NAVIGATION_FAVORITES |
| show mathematics files | SEARCH |
| take to my recent access | NAVIGATION_RECENT |
| i would like to see my recently accessed files screen | NAVIGATION_RECENT |
| find corona vaccine documents | SEARCH |
| get me to recently accessed files | NAVIGATION_RECENT |
| Please pull up task list | NAVIGATION_TASK |
| Display my favorite files | NAVIGATION_FAVORITES |
| I am looking for wind energy | SEARCH |
| Show my home screen | NAVIGATION_HOME |
| show me recently accessed files | NAVIGATION_RECENT |
| can you pull up recent access | NAVIGATION_RECENT |
| My tasks | NAVIGATION_TASK |
| terminate the ongoing session | LOGOUT |
| i would like to see my recently accessed documents | NAVIGATION_RECENT |
| account sign out | LOGOUT |
| view task list page | NAVIGATION_TASK |
| perform log out action | LOGOUT |
| open recent access documents | NAVIGATION_RECENT |
| take me to check out documents | NAVIGATION_CHECKOUT |
| display my recently accessed files | NAVIGATION_RECENT |
| Display my recently accessed | NAVIGATION_RECENT |
| which of the documents have malco theaters | SEARCH |
| Display my offline | NAVIGATION_OFFLINE |
| search the term offline | SEARCH |
| get me to favorites files | NAVIGATION_FAVORITES |
| Show my favorites documents | NAVIGATION_FAVORITES |
| i would like to see my checked out files | NAVIGATION_CHECKOUT |
| can you pull up favorites documents | NAVIGATION_FAVORITES |
| sign out from the d2mobile app | LOGOUT |
| visit landing page | NAVIGATION_HOME |
| recent access | NAVIGATION_RECENT |
| offline | NAVIGATION_OFFLINE |
| take me to offline page | NAVIGATION_OFFLINE |
| open recent access documents | NAVIGATION_RECENT |
| Go to recently accessed documents | NAVIGATION_RECENT |
| direct me to landing screen | NAVIGATION_HOME |
| i want to see recent access | NAVIGATION_RECENT |
| take to my check out files | NAVIGATION_CHECKOUT |
| open favorite files | NAVIGATION_FAVORITES |
| find the keyword task | SEARCH |
| put on view tasks | NAVIGATION_TASK |
| can you pull up offline documents | NAVIGATION_OFFLINE |
| search for the term offline in documents | SEARCH |

APPENDIX A-continued

| Text Phrase | Intent |
|---|---|
| open main page | NAVIGATION_HOME |
| please find dancing girl | SEARCH |
| show me the files with the word | SEARCH |
| show recent access document | NAVIGATION_RECENT |
| display favorite files | NAVIGATION_FAVORITES |
| go to my favorite | NAVIGATION_FAVORITES |
| view my tasks list screen | NAVIGATION_TASK |
| Display checked out files | NAVIGATION_CHECKOUT |
| can you pull up checked out | NAVIGATION_CHECKOUT |
| open recent access | NAVIGATION_RECENT |
| Show my favorite documents | NAVIGATION_FAVORITES |
| suggest some documents talking on chemical research | SEARCH |
| Show checked out documents | NAVIGATION_CHECKOUT |
| open recently accessed documents | NAVIGATION_RECENT |
| route me to the main widget screen | NAVIGATION_HOME |
| home screen display | NAVIGATION_HOME |
| Display my task | NAVIGATION_TASK |
| tasks | NAVIGATION_TASK |
| Go to recently accessed files | NAVIGATION_RECENT |
| Display offline | NAVIGATION_OFFLINE |
| Display my recent accessed files | NAVIGATION_RECENT |
| Display my home page | NAVIGATION_HOME |
| search for the term check out in documents | SEARCH |
| show me my tasks | NAVIGATION_TASK |
| I want to see my configured landing page | NAVIGATION_HOME |
| Show recent files | NAVIGATION_RECENT |
| can you pull up offline page | NAVIGATION_OFFLINE |
| suggest some files on chemical engineering | SEARCH |
| log out of the d2mobile app | LOGOUT |
| show me recent access documents | NAVIGATION_RECENT |
| pull all the pending task | NAVIGATION_TASK |
| task list | NAVIGATION_TASK |
| Display recently accessed files | NAVIGATION_RECENT |
| Display recently accessed files | NAVIGATION_RECENT |
| exit out of the session | LOGOUT |
| take to my favorites | NAVIGATION_FAVORITES |
| Display my check out documents | NAVIGATION_CHECKOUT |
| open home page | NAVIGATION_HOME |
| go to app home screen | NAVIGATION_HOME |
| find the word grass pitch | SEARCH |
| take to my recently accessed documents | NAVIGATION_RECENT |
| please take to my offline documents | NAVIGATION_OFFLINE |
| show me the sign in page | LOGOUT |
| please search for word documents | SEARCH |
| Display my checked out | NAVIGATION_CHECKOUT |
| sign out of the app | LOGOUT |
| open checked out files page | NAVIGATION_CHECKOUT |
| show me check out files | NAVIGATION_CHECKOUT |
| Go to favorites files | NAVIGATION_FAVORITES |
| go to list of task | NAVIGATION_TASK |
| Display my recently accessed documents | NAVIGATION_RECENT |
| i would like to see the files having restaurant booking | SEARCH |
| open home page | NAVIGATION_HOME |
| Show favorite files | NAVIGATION_FAVORITES |
| which files have malco theaters | SEARCH |
| view my first landing page | NAVIGATION_HOME |
| go to all my tasks | NAVIGATION_TASK |
| display offline files | NAVIGATION_OFFLINE |
| Show my offline documents | NAVIGATION_OFFLINE |
| show recent access tile | NAVIGATION_RECENT |
| show creative photograph | SEARCH |
| please find the documents having the word check out | SEARCH |
| list of engineering documents | SEARCH |
| get me all the documents with troops | SEARCH |
| display tasks | NAVIGATION_TASK |
| log out | LOGOUT |
| take me to recently accessed documents | NAVIGATION_RECENT |
| show recently accessed tile | NAVIGATION_RECENT |
| get me to offline files screen | NAVIGATION_OFFLINE |
| favorite files show | NAVIGATION_FAVORITES |
| Show my home page | NAVIGATION_HOME |

APPENDIX A-continued

| Text Phrase | Intent |
| --- | --- |
| can you pull up checked out documents | NAVIGATION_CHECKOUT |
| open offline files | NAVIGATION_OFFLINE |
| login as a different user | LOGOUT |
| find jono and ben | SEARCH |
| find food administrator resume | SEARCH |
| take me to recently accessed page | NAVIGATION_RECENT |
| Show recently accessed documents | NAVIGATION_RECENT |
| sign out | LOGOUT |
| open checked out documents | NAVIGATION_CHECKOUT |
| show me off to landing screen | NAVIGATION_HOME |
| show the files related to alice cooper | SEARCH |
| navigate to recently accessed | NAVIGATION_RECENT |
| search word recent | SEARCH |
| finish the session | LOGOUT |
| pull up checked out files screen | NAVIGATION_CHECKOUT |
| close the ongoing session | LOGOUT |
| Show recent access files | NAVIGATION_RECENT |
| take me to sign in page | LOGOUT |
| Display recent access files | NAVIGATION_RECENT |
| Show favorite documents | NAVIGATION_FAVORITES |
| show me the login page | LOGOUT |
| open offline | NAVIGATION_TASK |
| signout | LOGOUT |
| i would like to see my recent access documents | NAVIGATION_RECENT |
| please take me to checked out | NAVIGATION_CHECKOUT |
| Go to my offline | NAVIGATION_OFFLINE |
| find me animated movies | SEARCH |
| take me to checked out | NAVIGATION_CHECKOUT |
| pull up lawyer resumes | SEARCH |
| Display recently accessed documents | NAVIGATION_RECENT |
| home page | NAVIGATION_HOME |
| display my offline files | NAVIGATION_OFFLINE |
| sign out from the app | LOGOUT |
| show offline document | NAVIGATION_OFFLINE |
| get me to tasks | NAVIGATION_TASK |
| get me to main page | NAVIGATION_HOME |
| I want to log in with a different account | LOGOUT |
| search for the keyword science | SEARCH |
| Display my recent accessed files | NAVIGATION_RECENT |
| please look up the falls church news-press album | SEARCH |
| Display tasks | NAVIGATION_TASK |
| log out from the app | LOGOUT |
| take to my recent access files | NAVIGATION_RECENT |
| display list of my task | NAVIGATION_TASK |
| i would like to see my favorite files | NAVIGATION_FAVORITES |
| echo chamber find it for me | SEARCH |
| Display favorites documents | NAVIGATION_FAVORITES |
| please take me to favorite documents screen | NAVIGATION_FAVORITES |
| get me to favorites documents | NAVIGATION_FAVORITES |
| Display my recent documents | NAVIGATION_RECENT |
| get me to offline documents | NAVIGATION_OFFLINE |
| Show my recently accessed documents | NAVIGATION_RECENT |
| take me to landing screen | NAVIGATION_HOME |
| show the files having forecast | SEARCH |
| Go to recently accessed documents | NAVIGATION_RECENT |
| show me the cape mount documents | SEARCH |
| tasks list show | NAVIGATION_TASK |
| Display my tasks | NAVIGATION_TASK |
| get me to recent access files | NAVIGATION_RECENT |
| take to my tasks | NAVIGATION_TASK |
| put on view all my list of tasks | NAVIGATION_TASK |
| Go to recent accessed | NAVIGATION_RECENT |
| Please show home | NAVIGATION_HOME |
| i want to see my tasks | NAVIGATION_TASK |
| open recent access | NAVIGATION_RECENT |
| Show recently accessed files | NAVIGATION_RECENT |
| Show checked out files | NAVIGATION_CHECKOUT |
| my task list | NAVIGATION_TASK |
| take to my offline documents | NAVIGATION_OFFLINE |
| log out of the app | LOGOUT |
| please find me the docs having engineering | SEARCH |
| route to tasks | NAVIGATION_TASK |
| Show recently accessed files | NAVIGATION_RECENT |
| Please show checked out | NAVIGATION_CHECKOUT |

APPENDIX A-continued

| Text Phrase | Intent |
| --- | --- |
| recently accessed files show | NAVIGATION_RECENT |
| I want to see tasks | NAVIGATION_TASK |
| show the log in screen | LOGOUT |
| take me to favorites documents | NAVIGATION_FAVORITES |
| checked out | NAVIGATION_CHECKOUT |
| open offline documents | NAVIGATION_OFFLINE |
| open recently accessed files screen | NAVIGATION_RECENT |
| Please show recently accessed screen | NAVIGATION_RECENT |
| Show my recent access files screen | NAVIGATION_RECENT |
| list of resumes | SEARCH |
| take to my favorite documents | NAVIGATION_FAVORITES |
| sign out immediately from the app | LOGOUT |
| Please pull up favorite documents | NAVIGATION_FAVORITES |
| show me offline documents | NAVIGATION_OFFLINE |
| log out now | LOGOUT |
| Display my favorite documents | NAVIGATION_FAVORITES |
| direct me to home | NAVIGATION_HOME |
| open offline | NAVIGATION_OFFLINE |
| get me to recent access tile | NAVIGATION_RECENT |
| find the hundred-foot journey | SEARCH |
| Show checked out files | NAVIGATION_CHECKOUT |
| Display recent accessed files | NAVIGATION_RECENT |
| display task tile | NAVIGATION_TASK |
| i want to see checked out | NAVIGATION_CHECKOUT |
| sign out of my account | LOGOUT |
| Display offline documents screen | NAVIGATION_OFFLINE |
| i want to see home page | NAVIGATION_HOME |
| recent access | NAVIGATION_RECENT |
| take me to recent access documents | NAVIGATION_RECENT |
| recent access files show | NAVIGATION_RECENT |
| show task list | NAVIGATION_TASK |
| Display my offline | NAVIGATION_OFFLINE |
| show me offline files | NAVIGATION_OFFLINE |
| take me to recent access files page | NAVIGATION_RECENT |
| Please show offline | NAVIGATION_OFFLINE |
| i would like to see my checked out documents | NAVIGATION_CHECKOUT |
| Display my checked out files | NAVIGATION_CHECKOUT |
| get me to my tasks | NAVIGATION_TASK |
| pull up tasks list | NAVIGATION_TASK |
| search for the phrase offline | SEARCH |
| Go to recently accessed | NAVIGATION_RECENT |
| Go to offline | NAVIGATION_OFFLINE |
| visit main page | NAVIGATION_HOME |
| Please pull up offline documents | NAVIGATION_OFFLINE |
| Display checked out documents | NAVIGATION_CHECKOUT |
| search project related docs | SEARCH |
| can you pull up recently accessed documents | NAVIGATION_RECENT |
| open favorite documents | NAVIGATION_FAVORITES |
| Go to offline files screen | NAVIGATION_OFFLINE |
| search for temperature controlled documents | SEARCH |
| navigate to favorites | NAVIGATION_FAVORITES |
| Go to my checked out documents | NAVIGATION_CHECKOUT |
| show me the mobile core share ixd | SEARCH |
| get me the list of documents focusing on corona drugs | SEARCH |
| favorite documents display | NAVIGATION_FAVORITES |
| show offline tile | NAVIGATION_OFFLINE |
| help me to locate lawyer resume | SEARCH |
| Go to recent access files | NAVIGATION_RECENT |
| Show my checked out files | NAVIGATION_CHECKOUT |
| search for the keyword favorites | SEARCH |
| open recently accessed screen | NAVIGATION_RECENT |
| open favorite | NAVIGATION_FAVORITES |
| Display my favorite | NAVIGATION_FAVORITES |
| lock out | LOGOUT |
| navigate to offline | NAVIGATION_OFFLINE |
| would like to find all the visual files | SEARCH |
| open favorites | NAVIGATION_FAVORITES |
| log out of my account | LOGOUT |
| log out immediately from the app | LOGOUT |
| Go to my favorite documents | NAVIGATION_FAVORITES |
| Display my offline files | NAVIGATION_OFFLINE |
| Display my recent access page | NAVIGATION_RECENT |
| Display my tasks list screen | NAVIGATION_TASK |
| Display checked out documents | NAVIGATION_CHECKOUT |

APPENDIX A-continued

| Text Phrase | Intent |
|---|---|
| take to my checked out documents | NAVIGATION_CHECKOUT |
| Go to home screen | NAVIGATION_HOME |
| take me to offline documents | NAVIGATION_OFFLINE |
| i would like to see my offline documents | NAVIGATION_OFFLINE |
| Show offline documents | NAVIGATION_OFFLINE |
| go to my home | NAVIGATION_HOME |
| i want to see the files having temperature | SEARCH |
| go to app landing page | NAVIGATION_HOME |
| Please pull up recent documents | NAVIGATION_RECENT |
| please show me the login page | LOGOUT |
| open check out documents | NAVIGATION_CHECKOUT |
| display recently accessed documents | NAVIGATION_RECENT |
| display favorite documents | NAVIGATION_FAVORITES |
| please sign-out from the app | LOGOUT |
| display recent documents | NAVIGATION_RECENT |
| here search for the term task | SEARCH |
| logging off | LOGOUT |
| Show my checked out documents | NAVIGATION_CHECKOUT |
| open landing page | NAVIGATION_HOME |
| Display favorites | NAVIGATION_FAVORITES |
| offline files show | NAVIGATION_OFFLINE |
| close user session | LOGOUT |
| go directly to home | NAVIGATION_HOME |
| can you pull up favorites page | NAVIGATION_FAVORITES |
| Display favorite files | NAVIGATION_FAVORITES |
| get me the documents with word task | SEARCH |
| Display recently accessed page | NAVIGATION_RECENT |
| show me recently accessed documents | NAVIGATION_RECENT |
| Go to tasks | NAVIGATION_TASK |
| i would like to see my recent access files | NAVIGATION_RECENT |
| display my landing page | NAVIGATION_HOME |
| can you pull up home page | NAVIGATION_HOME |
| put on view my tasks | NAVIGATION_TASK |
| get the log in page | LOGOUT |
| direct me to main page | NAVIGATION_HOME |
| i want to see offline | NAVIGATION_OFFLINE |
| i would like to see my landing page | NAVIGATION_HOME |
| Display recent access documents | NAVIGATION_RECENT |
| Show favorites files | NAVIGATION_FAVORITES |
| search for pdf documents | SEARCH |
| take me to home page | NAVIGATION_HOME |
| navigate to recent access | NAVIGATION_RECENT |
| Go to landing screen | NAVIGATION_HOME |
| Show my recent access documents | NAVIGATION_RECENT |
| take me directly to all my tasks | NAVIGATION_TASK |
| Go to favorites documents screen | NAVIGATION_FAVORITES |
| display offline documents | NAVIGATION_OFFLINE |
| find fish story | SEARCH |
| Display offline files | NAVIGATION_OFFLINE |
| take me to recently accessed files | NAVIGATION_RECENT |
| take me to offline documents | NAVIGATION_OFFLINE |
| go to my list of all pending tasks | NAVIGATION_TASK |
| search for favorite word file | SEARCH |
| Display my recently accessed files | NAVIGATION_RECENT |
| please close the ongoing session | LOGOUT |
| logout | LOGOUT |
| Display main screen | NAVIGATION_HOME |
| display my tasks | NAVIGATION_TASK |
| please can you pull up offline documents | NAVIGATION_OFFLINE |
| get me to favorites tile | NAVIGATION_FAVORITES |
| take to my recent documents | NAVIGATION_RECENT |
| Display checked out | NAVIGATION_CHECKOUT |
| open checked out | NAVIGATION_CHECKOUT |
| Go to checked out files | NAVIGATION_CHECKOUT |
| pull up recently accessed files | NAVIGATION_RECENT |
| Show my recent access documents | NAVIGATION_RECENT |
| Go to recent access documents | NAVIGATION_RECENT |
| show recently accessed document | NAVIGATION_RECENT |
| take to my home | NAVIGATION_HOME |
| locate molecular entity files | SEARCH |
| get me to checked out tile | NAVIGATION_CHECKOUT |
| show favorites document | NAVIGATION_FAVORITES |
| landing page | NAVIGATION_HOME |
| find the keyword offline | SEARCH |

APPENDIX A-continued

| Text Phrase | Intent |
|---|---|
| Go to offline documents | NAVIGATION_OFFLINE |
| Go to recently accessed files | NAVIGATION_RECENT |
| can you pull up tasks | NAVIGATION_TASK |
| is there any file having creative work | SEARCH |
| hey d2mobile exit the ongoing session | LOGOUT |
| search for favorite keyword documents | SEARCH |
| take me to recent access documents | NAVIGATION_RECENT |
| get me to recent documents | NAVIGATION_RECENT |
| i would like to see my offline files | NAVIGATION_OFFLINE |
| take me to favorites files | NAVIGATION_FAVORITES |
| Go to my recent access documents | NAVIGATION_RECENT |
| Go to checked out files screen | NAVIGATION_CHECKOUT |
| Go to my recently accessed documents | NAVIGATION_RECENT |
| show me home | NAVIGATION_HOME |
| take me to favorite documents screen | NAVIGATION_FAVORITES |
| can you pull up recently accessed | NAVIGATION_RECENT |
| take me to offline files | NAVIGATION_OFFLINE |
| find pfizer patent | SEARCH |
| show me favorite files | NAVIGATION_FAVORITES |
| view tasks page | NAVIGATION_TASK |
| Show my recently accessed documents | NAVIGATION_RECENT |
| display my checked out files | NAVIGATION_CHECKOUT |
| pull up favorites files | NAVIGATION_FAVORITES |
| take me to checked out files page | NAVIGATION_CHECKOUT |
| Go to recent access | NAVIGATION_RECENT |
| Please pull up landing page | NAVIGATION_HOME |
| find a document called victory march | SEARCH |
| can you pull up landing page | NAVIGATION_HOME |
| Show my recently accessed files | NAVIGATION_RECENT |
| navigate to checked out | NAVIGATION_CHECKOUT |
| sign off | LOGOUT |
| terminate d2mobile app session | LOGOUT |
| take me to tasks screen | NAVIGATION_TASK |
| view my home screen | NAVIGATION_HOME |
| Show recent access documents | NAVIGATION_RECENT |
| Go to tasks | NAVIGATION_TASK |
| take to my checked out | NAVIGATION_CHECKOUT |
| leave the app | LOGOUT |
| show me checked out documents | NAVIGATION_CHECKOUT |
| Show my offline files | NAVIGATION_OFFLINE |
| Go to offline documents | NAVIGATION_OFFLINE |
| open offline files | NAVIGATION_OFFLINE |
| Show my favorite documents | NAVIGATION_FAVORITES |
| which files have plant research | SEARCH |
| open offline | NAVIGATION_OFFLINE |
| Go to checked out documents | NAVIGATION_CHECKOUT |
| would like to find all the pdf | SEARCH |
| search for the word offline | SEARCH |
| display checked out files | NAVIGATION_CHECKOUT |
| Show my favorite files screen | NAVIGATION_FAVORITES |
| Please pull up recent documents | NAVIGATION_RECENT |
| Display my checked out | NAVIGATION_CHECKOUT |
| display recently accessed files | NAVIGATION_RECENT |
| open recent access files | NAVIGATION_RECENT |
| open recently accessed | NAVIGATION_RECENT |
| Go to checked out | NAVIGATION_CHECKOUT |
| get me to offline tile | NAVIGATION_OFFLINE |
| offline | NAVIGATION_OFFLINE |
| stop session | LOGOUT |
| Show recently accessed documents | NAVIGATION_RECENT |
| Please show recent access | NAVIGATION_RECENT |
| recently accessed | NAVIGATION_RECENT |
| Show my favorites files | NAVIGATION_FAVORITES |
| Show favorites documents | NAVIGATION_FAVORITES |
| signout of the app | LOGOUT |
| terminate user session | LOGOUT |
| please open checked out files page | NAVIGATION_CHECKOUT |
| Display my favorites page | NAVIGATION_FAVORITES |
| Show my offline files | NAVIGATION_OFFLINE |
| search for sop document | SEARCH |
| show checked out document | NAVIGATION_CHECKOUT |
| Show my task | NAVIGATION_TASK |
| Go to my check out | NAVIGATION_CHECKOUT |
| close current session | LOGOUT |

What is claimed is:

1. A device for an intent-based voice assistant, the device comprising:

23 a processor;
a memory storing:
   a self-contained artificial intelligence model trained to map input text to a plurality of intents;
   a knowledge base that maps the plurality of intents to application actions supported by an application on the device, wherein the plurality of intents includes an intent that maps to a context based action, wherein the knowledge base specifies application state context data for the context based action; and
   stored instructions translatable by the processor for:
      running a speech-to-text converter to convert a voice input to a text string;
      running the self-contained artificial intelligence model to process the text string to output a corresponding intent for the text string;
      mapping the corresponding intent output by the self-contained artificial intelligence model for the text string to a corresponding application action; and
      executing the corresponding application action using the application.

2. The device of claim 1, wherein the voice input is converted to the corresponding intent without a call over a network.

3. The device of claim 1, wherein the text string is a plurality of words determined from the voice input.

4. The device of claim 1, wherein the self-contained artificial intelligence model comprises a neural network.

5. The device of claim 4, wherein the memory further comprises a confidence threshold, wherein the self-contained artificial intelligence model is executable to output a confidence for the corresponding intent, wherein the stored instructions further comprise instructions translatable by the processor for comparing the confidence for the corresponding intent to the confidence threshold, and passing the corresponding intent to the application based on a determination that the confidence for the corresponding intent meets the confidence threshold.

6. The device of claim 1, wherein the self-contained artificial intelligence model is a lightweight model executable to run on the processor with the application.

7. The device of claim 1, wherein the corresponding intent is a class label indicating a content management action.

8. The device of claim 1, wherein the application is a mobile application developed in a development environment of a content management system that allows users to develop applications on the content management system, and wherein the self-contained artificial intelligence model is customized to the mobile application from a base model for applications developed in the development environment.

9. A method for an intent-based model, the method comprising:
   creating a self-contained artificial intelligence model to predict intents from text input, the self-contained artificial intelligence model trained with training data comprising:
   text phrases; and
   a plurality of intents that correspond to actions executable by an application; and
   deploying the self-contained artificial intelligence model, a voice assistant executable to use the self-contained artificial intelligence model, and a knowledge base that maps the plurality of intents to actions executable by the application to a mobile device for use by the application at the mobile device, wherein the plurality of intents comprises an intent that maps to a context based action, wherein the knowledge base specifies application state context data for the context based action.

10. The method of claim 9, wherein the self-contained artificial intelligence model is a lightweight model executable to run on a same processor with the application.

11. The method of claim 10, further comprising:
   updating the self-contained artificial intelligence model with a new training phrase to create an updated artificial intelligence model:
   exporting the updated artificial intelligence model to the mobile device.

12. The method of claim 9, further comprising using the voice assistant at the mobile device to determine a corresponding intent for a voice input while the mobile device is offline.

13. The method of claim 12, wherein the corresponding intent is a class label indicating a content management action, wherein the self-contained artificial intelligence model and the voice assistant are deployed in a software development kit.

14. The method of claim 9, wherein the application is a mobile application developed in a development environment of a content management system that allows users to develop applications on the content management system, wherein the development environment defines actions with which applications developed in the development environment can be configured;
   wherein creating the self-contained artificial intelligence model to predict intents comprises:
      training a base model with the training data to create a custom model customized for the mobile application; and
      converting the custom model to a lighter weight model to create the self-contained artificial intelligence model.

15. A method for voice-based assistance, the method comprising:
   running a speech-to-text converter on a hardware processor to convert a voice input to a text string;
   running a self-contained artificial intelligence model on the hardware processor, the self-contained artificial intelligence model trained to map input text to a plurality of intents;
   processing the text string using the self-contained artificial intelligence model to predict a corresponding intent from the plurality of intents;
   accessing a knowledge base that maps the plurality of intents to application actions supported by an application to map the corresponding intent to a corresponding application action, wherein the plurality of intents includes an intent that maps to a context based action, wherein the knowledge base specifies application state context data for the context based action; and
   executing the corresponding application action using the application.

16. The method of claim 15, wherein the voice input is converted to the corresponding intent without a call over a network.

17. The method of claim 15, further comprising:
   the self-contained artificial intelligence model outputting a confidence for the corresponding intent;
   comparing the confidence for the corresponding intent to a confidence threshold; and
   passing the corresponding intent to the application based on a determination that the confidence for the corresponding intent meets the confidence threshold.

18. The method of claim 15, wherein the self-contained artificial intelligence model comprises a neural network.

19. The method of claim 15, further comprising distributing the self-contained artificial intelligence model to a plurality of hardware processors.

20. The method of claim 15, wherein the self-contained artificial intelligence model is a lightweight model that runs on the same hardware processor with the application.

21. The method of claim 15, wherein the corresponding intent is a class label indicating a content management action.

22. The method of claim 15, wherein the self-contained artificial intelligence model comprises:

an input layer;

a mapping layer; and an output layer.

23. The method of claim 15, wherein the application is a mobile application developed in a development environment of a content management system that allows users to develop applications for use with the content management system, and wherein the self-contained artificial intelligence model is customized to the mobile application from a base model for applications developed in the development environment.

* * * * *